United States Patent
Chun et al.

(10) Patent No.: US 10,150,372 B2
(45) Date of Patent: Dec. 11, 2018

(54) POWER FACTOR IMPROVING CIRCUIT AND CHARGER FOR VEHICLES EMPLOYING THE SAME

(71) Applicant: HYUNDAI MOTOR COMPANY, Seoul (KR)

(72) Inventors: Ho Tae Chun, Daejeon (KR); Chang Han Jun, Gyeonggi-do (KR); Jin Young Yang, Gyeonggi-do (KR); Seung Hyun Han, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 112 days.

(21) Appl. No.: 15/058,437

(22) Filed: Mar. 2, 2016

(65) Prior Publication Data
US 2017/0144555 A1 May 25, 2017

(30) Foreign Application Priority Data
Nov. 23, 2015 (KR) .................. 10-2015-0163879

(51) Int. Cl.
*H02J 7/00* (2006.01)
*B60L 11/18* (2006.01)
(Continued)

(52) U.S. Cl.
CPC ......... *B60L 11/1811* (2013.01); *B60L 11/005* (2013.01); *B60L 11/184* (2013.01);
(Continued)

(58) Field of Classification Search
USPC .... 363/15, 17, 108, 100, 124, 142; 265/242, 265/246, 259, 268, 210
See application file for complete search history.

(56) References Cited

U.S. PATENT DOCUMENTS 8,076,920 B1* 12/2011 Melanson ........... H02M 1/4208
  315/247
8,482,944 B1* 7/2013 Fukuda ................. H02H 9/002
  323/222
(Continued)

FOREIGN PATENT DOCUMENTS

JP 05191976 7/1993
JP 05204478 8/1993
(Continued)

OTHER PUBLICATIONS

Notice of Allowance for Korean Patent Application 10-2015-0163879 dated Feb. 13, 2018, 5 pages.

*Primary Examiner* — Brian Ngo
(74) *Attorney, Agent, or Firm* — Brinks Gilson & Lione

(57) ABSTRACT

Forms of the present disclosure include an input end, and an output end connected to the input end to improve a power factor through the input end. The output end includes non-electrolytic capacitors formed at both sides of an electrolytic capacitor for output, and first inductors formed between the respective non-electrolytic capacitors and the electrolytic capacitor. Therefore, forms of the present disclosure may reduce a ripple current (current stress) at a PFC output end through a CL circuit formed at a left side with respect to the electrolytic capacitor, and reduce an input ripple current (input current stress) of a DC-DC converter through an LC circuit formed at a right side.

9 Claims, 3 Drawing Sheets

(51) Int. Cl.
*B60L 11/00* (2006.01)
*H02M 1/42* (2007.01)
*H02J 7/02* (2016.01)

(52) U.S. Cl.
CPC ....... *B60L 11/1812* (2013.01); *B60L 11/1816* (2013.01); *H02J 7/0052* (2013.01); *H02J 7/022* (2013.01); *H02M 1/4208* (2013.01); *B60L 2270/147* (2013.01); *H02J 2007/0059* (2013.01); *Y02B 70/126* (2013.01)

(56) References Cited

U.S. PATENT DOCUMENTS

| | | | |
|---|---|---|---|
| 9,318,958 B2* | 4/2016 | Sagneri | H02M 3/335 |
| 2004/0079953 A1* | 4/2004 | Mednik | H02M 1/4208 |
| | | | 257/82 |
| 2006/0132081 A1* | 6/2006 | Clothier | H02M 1/425 |
| | | | 318/701 |
| 2012/0069606 A1* | 3/2012 | Sagneri | H02M 3/158 |
| | | | 363/21.02 |
| 2013/0082666 A1* | 4/2013 | Tsai | H02M 1/4208 |
| | | | 323/207 |
| 2014/0153306 A1* | 6/2014 | Pan | H02M 1/4208 |
| | | | 363/126 |
| 2014/0369077 A1 | 12/2014 | Chun et al. | |
| 2015/0229288 A1* | 8/2015 | Kisner | H03H 1/0007 |
| | | | 333/181 |

FOREIGN PATENT DOCUMENTS

| | | |
|---|---|---|
| JP | 06028835 A * | 2/1994 |
| JP | 2001268939 | 9/2001 |
| JP | 2005-269883 A | 9/2005 |
| JP | 2008172868 | 7/2008 |
| JP | 2009095183 | 4/2009 |
| JP | 2010029039 | 2/2010 |
| KR | 10-2013-0058061 A | 6/2013 |

* cited by examiner

US 10,150,372 B2

POWER FACTOR IMPROVING CIRCUIT AND CHARGER FOR VEHICLES EMPLOYING THE SAME

CROSS-REFERENCE TO RELATED APPLICATION

This application claims the benefit of Korean Patent Application No. 10-2015-0163879, filed on Nov. 23, 2015, the entire contents of which is hereby incorporated by reference.

BACKGROUND OF THE INVENTION

Field of the Invention

The present disclosure relates to a circuit for improving a power factor and a charger for vehicles employing the circuit.

Discussion of the Related Art

Pollution-free and eco-friendly vehicles have recently become prominent. Such an eco-friendly vehicle has been essentially using a converter for charging a battery with a high voltage. The converter requires a power factor correction (PFC) circuit intended to increase a voltage and improve a power factor.

The PFC circuit requires a high rated voltage and a high capacity, and thus an electrolytic capacitor, which is most advantageous in terms of packaging at the time of design, has been used.

The electrolytic capacitor may satisfy a high rated voltage and a high capacity while the electrolytic capacitor is small. However, the electrolytic capacitor has a dielectric of a liquid substance, and thus degradation of reliability due to current stress (current ripple) has emerged as a serious problem.

For example, an electrolyte evaporates when the electrolytic capacitor is exposed to a great amount of ripple current. As a result, the dielectric cannot properly operate, which leads to decrease in capacity of the capacitor.

Further, the above-described converter uses high-voltage alternating current (AC) power as an input, and is involved with high frequency switching. Thus, the converter has been significantly weak in terms of electromagnetic compatibility (EMC).

When countermeasures for EMC cannot be established, marketability of a whole vehicle in addition to the converter as a single unit may be degraded. Seriously, a risk of dissatisfaction with vehicle regulations may be entailed.

SUMMARY

Accordingly, the present disclosure is directed to a power factor improving circuit for reducing current stress and a charger for vehicles employing the same that substantially obviate one or more problems due to limitations and disadvantages of the related art.

In addition, another object of the present disclosure is to provide a power factor improving circuit for improving EMC performance and a charger for vehicles employing the same.

To achieve these objects and other advantages and in accordance with the purpose of the disclosure, as embodied and broadly described herein, a power factor improving circuit includes an input end, and an output end connected to the input end to improve a power factor through the input end, wherein the output end includes non-electrolytic capacitors formed at both sides of an electrolytic capacitor for output and first inductors formed between the respective non-electrolytic capacitors and the electrolytic capacitor.

The input end may include an input power supply, a second inductor, a diode, and an insulated gate field-effect transistor (IGFET) circuit connected to one another in series and in parallel.

Each of the non-electrolytic capacitors may correspond to a film capacitor or a ceramic capacitor.

The first inductors may be coupled at the both sides of the electrolytic capacitor.

The non-electrolytic capacitors may be connected to the first inductors in parallel.

In another aspect of the present invention, a charger for vehicles for charging a high-voltage battery includes a power factor improving circuit including an input end, and an output end connected to the input end to improve a power factor through the input end, and a direct current (DC)-DC converter connected to the output end to invert a first DC voltage including a sinusoidal wave output from the power factor improving circuit into an alternating current (AC) voltage, and to convert the inverted AC voltage into a second DC voltage.

The output end may include non-electrolytic capacitors formed at both sides of an electrolytic capacitor for output, and first inductors formed between the respective non-electrolytic capacitors and the electrolytic capacitor.

The input end may include an input power supply, a second inductor, a diode, and an IGFET circuit connected to one another in series and in parallel.

Each of the non-electrolytic capacitors may correspond to a film capacitor or a ceramic capacitor.

The first inductors may be coupled at the both sides of the electrolytic capacitor.

The DC-DC converter may correspond to a boost converter.

The non-electrolytic capacitors may be connected to the first inductors in parallel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to forms of the present disclosure, examples of which are illustrated in the accompanying drawings. Wherever possible, the same reference numbers will be used throughout the drawings to refer to the same or like parts, and repeated description thereof will be omitted.

Terms described in embodiments below are merely used to describe a particular embodiment and there is no intention to restrict the invention thereto.

For example, a suffix 'end' disclosed in the present specification below is applied or combined based only on easy of writing the specification, and the suffix "end" does not have a distinguishable meaning or function.

In addition, terms including ordinals such as "first" and "second" described in forms of the disclosure below may be used to describe various components. However, the components are not restricted by the terms. The terms are used to distinguish one component from another component.

Further, it can be understood that a singular expression used in description of various forms of the disclosure and claims includes a plural expression unless the expression has a clearly different meaning in context.

Furthermore, it should be understood that a term "and/or" disclosed in forms of the disclosure below includes arbitrary and all possible combinations of one or more items among listed pertinent details.

In addition, terms "includes", "forms", etc. described in forms of the disclosure below should be interpreted not to exclude other elements but to further include such other elements since the corresponding elements may be inherent unless mentioned otherwise.

<Example of Power Factor Improving Circuit>

Figure 1:
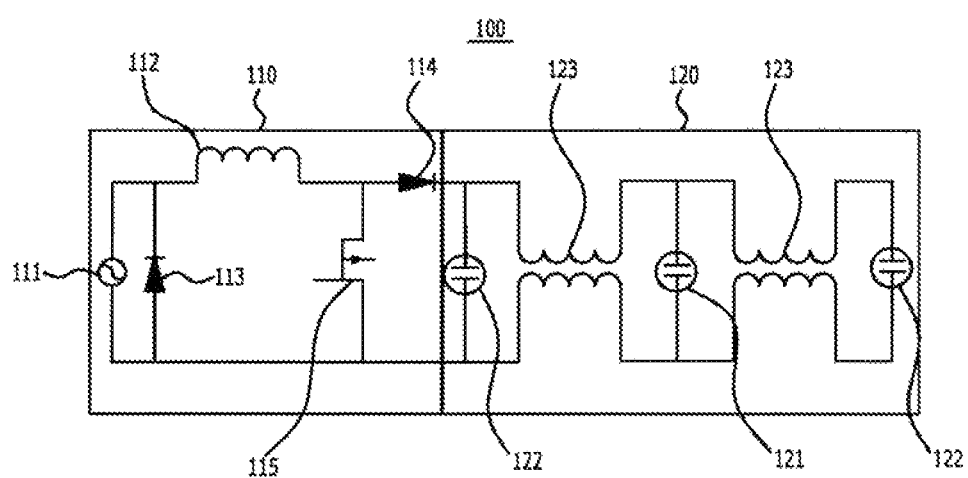
FIG. 1 is a circuit diagram illustrating an example of a power factor improving circuit.

FIG. 1 illustrates an example of a power factor improving circuit 100.

In FIG. 1, the power factor improving circuit 100 includes an input end 110 and an output end 120 to improve a power factor.

The input end 110 may control an input current or an input voltage such that a peak value of the input current follows the input voltage.

To this end, the input end 110 includes a power supply 111, an inductor 112 connected to the power supply 111, a first diode 113 connected in parallel between the power supply 111 and the inductor 112, a second diode 114 connected to the inductor 112, and an insulated gate field-effect transistor (IGFET) circuit 115 connected in parallel between the inductor 112 and the second diode 114.

Meanwhile, the output end 120 may be connected to the input end 110 to generate a sinusoidal wave by following an input voltage of the input end 110, thereby improving a power factor and coping with harmonic regulation.

To this end, the output end 120 may form an electrolytic capacitor 121 for output and non-electrolytic capacitors 122 and 122 connected to both sides of the electrolytic capacitor 121.

In general, the electrolytic capacitor 121 has a dielectric of a liquid substance which is widely known, and thus degradation of reliability is entailed due to current stress (current ripple).

In this regard, in order to prevent degradation of reliability due to current stress, the non-electrolytic capacitors 122 and 122 may be connected to both sides of the electrolytic capacitor 121, and first inductors 123 and 123 may be formed between the respective non-electrolytic capacitors 122 and 122 and the electrolytic capacitor 121.

In this case, the non-electrolytic capacitor 122 and the first inductor 123 are formed at a left side with respect to the electrolytic capacitor 121.

A connection relation therebetween in the circuit is as below. The left non-electrolytic capacitor 122 may be connected in parallel to the input end 110, the left first inductor 123 may be connected in parallel to the left non-electrolytic capacitor 122, and the left first inductor 123 may be connected in parallel to the electrolytic capacitor 121 for output.

When the non-electrolytic capacitor 122 and the first inductor 123 are formed at the left side with respect to the electrolytic capacitor 121 as described above, the capacitor and the inductor may function as a CL filter of the output end 120 of the PFC circuit. The CL filter may reduce current stress (ripple current) due to the electrolytic capacitor 121 described above.

Here, the left non-electrolytic capacitor 122 may be manufactured as a film capacitor or a ceramic capacitor, and the first inductor 123 formed between the left non-electrolytic capacitor 122 and the electrolytic capacitor 121 may have a coupling structure.

The left first inductor 123 has the coupling structure to improve an EMC problem.

For example, when the one first inductor 123 is formed between the left non-electrolytic capacitor 122 and the electrolytic capacitor 121, a phase difference due to noise may occur between high voltages generated from the input end 110, and high-voltage common-mode noise due to the phase difference may be left at the output end 120, causing a serious EMC problem.

Therefore, the coupled first inductor 123 is formed between the left non-electrolytic capacitor 122 and the electrolytic capacitor 121 to prevent the above-described EMC problem.

Meanwhile, the first inductor 123 and the non-electrolytic capacitor 122 may be formed at a right side with respect to the electrolytic capacitor 121 for output.

A connection relation therebetween in the circuit is as below. The right first inductor 123 may be connected in parallel to the electrolytic capacitor 121, and the right non-electrolytic capacitor 122 may be connected in parallel to the right first inductor 123.

When the first inductor 123 and the non-electrolytic capacitor 122 are formed at the left side with respect to the electrolytic capacitor 121 as described above, the inductor and the capacitor may function as an LC filter of the output end 120 of the PFC circuit. The LC filter may reduce an input ripple current of a direct current (DC)-DC converter to be connected to the output end 120, and thus may be considered to eventually reduce current stress (ripple current) due to the electrolytic capacitor 121 described above.

Here, the right non-electrolytic capacitor 122 may be manufactured as a film capacitor or a ceramic capacitor, and the first inductor 123 formed between the electrolytic capacitor 121 and the right non-electrolytic capacitor 122 may have a coupling structure.

The right first inductor 123 has the coupling structure to improve an EMC problem.

For example, when the one first inductor 123 is formed between the right non-electrolytic capacitor 122 and the electrolytic capacitor 121, a phase difference due to noise may occur between high voltages generated from the input end 110, and high-voltage common-mode noise due to the phase difference may be left at the output end 120 to cause a serious EMC problem.

Therefore, the coupled first inductor 123 is formed between the right non-electrolytic capacitor 122 and the electrolytic capacitor 121 to prevent the above-described EMC problem.

As is understood from the above description, the coupled first inductors 123 and 123 are applied to the both ends of the electrolytic capacitor 121, thereby balancing an inductance between (+)/(−) of a high-voltage link generated from the input end 110 to reduce high-voltage common-mode noise. In this way, it is possible to improve EMC performance in the power factor improving circuit 100.

<Example of Charger>

Figure 2:
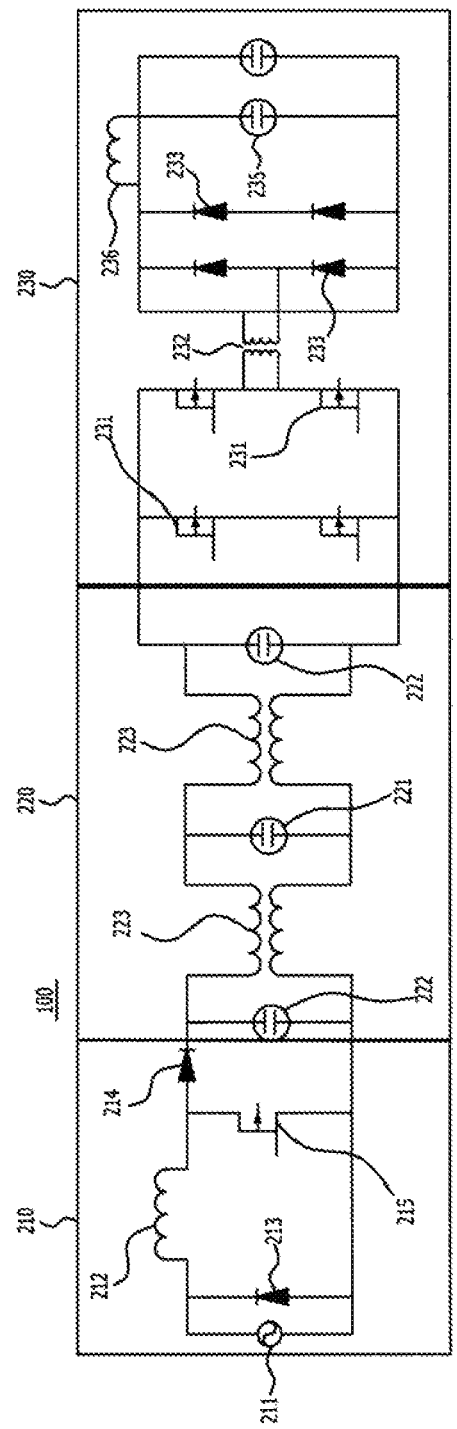
FIG. 2 is a circuit diagram illustrating an example of a charger for vehicles.

FIG. 2 illustrates an example of a charger for vehicles 200.

Referring to FIG. 2, the charger for vehicles 200 according to the embodiment includes a power factor improving circuit and a DC-DC converter 230 to charge a high-voltage battery, and the power factor improving circuit includes an input end 210 and an output end 220.

The input end 210 may control an input current or an input voltage such that a peak value of the input current follows the input voltage.

To this end, the input end 210 includes a power supply 211, an inductor 212 connected to the power supply 211, a first diode 213 connected in parallel between the power supply 211 and the inductor 212, a second diode 214 connected to the inductor 212, and an insulated gate field-effect transistor (IGFET) circuit 215 connected in parallel between the inductor 212 and the second diode 214.

Meanwhile, the output end 220 may be connected to the input end 210 to generate a sinusoidal wave by following an input voltage of the input end 210, thereby improving a power factor and coping with harmonic regulation.

To this end, the output end 220 may form an electrolytic capacitor 221 for output and non-electrolytic capacitors 222 and 222 connected to both sides of the electrolytic capacitor 221.

In general, the electrolytic capacitor 121 has a widely known dielectric of a liquid substance, and thus degradation of reliability is entailed due to current stress (current ripple).

In this regard, in order to prevent degradation of reliability due to current stress, the non-electrolytic capacitors 222 and 222 may be connected to the both sides of the electrolytic capacitor 221, and first inductors 223 and 223 may be formed between the respective non-electrolytic capacitors 222 and 222 and the electrolytic capacitor 221.

In this case, the non-electrolytic capacitor 222 and the first inductor 223 are formed at a left side with respect to the electrolytic capacitor 221.

A connection relation therebetween in the circuit is given below. The left non-electrolytic capacitor 222 may be connected in parallel to the input end 210, the left first inductor 223 may be connected in parallel to the left non-electrolytic capacitor 222, and the left first inductor 223 may be connected in parallel to the electrolytic capacitor 221 for output.

When the non-electrolytic capacitor 222 and the first inductor 223 are formed at the left side with respect to the electrolytic capacitor 221 as described above, the capacitor and the inductor may function as a CL filter of the output end 220 of the PFC circuit. The CL filter may reduce current stress (ripple current) due to the electrolytic capacitor 221 described above.

Here, the left non-electrolytic capacitor 222 may be manufactured as a film capacitor or a ceramic capacitor, and the first inductor 223 formed between the left non-electrolytic capacitor 222 and the electrolytic capacitor 221 may have a coupling structure.

The left first inductor 223 has the coupling structure to improve an EMC problem.

For example, when the one first inductor 223 is formed between the left non-electrolytic capacitor 222 and the electrolytic capacitor 221, a phase difference due to noise may occur between high voltages generated from the input end 210, and high-voltage common-mode noise due to the phase difference may be left at the output end 220, causing a serious EMC problem.

Therefore, the coupled first inductor 223 is formed between the left non-electrolytic capacitor 222 and the electrolytic capacitor 221 to prevent the above-described EMC problem.

Meanwhile, the first inductor 223 and the non-electrolytic capacitor 222 may be formed at a right side with respect to the electrolytic capacitor 221 for output.

A connection relation therebetween in the circuit is as below. The right first inductor 223 may be connected in parallel to the electrolytic capacitor 221, and the right non-electrolytic capacitor 222 may be connected in parallel to the right first inductor 223.

When the first inductor 223 and the non-electrolytic capacitor 222 are formed at the left side with respect to the electrolytic capacitor 221 as described above, the inductor and the capacitor may function as an LC filter of the output end 220 of the PFC circuit. The LC filter may reduce an input ripple current of the DC-DC converter 230 connected to the output end 220, and thus may be considered to eventually reduce current stress (ripple current) due to the electrolytic capacitor 221 described above.

Here, the right non-electrolytic capacitor 222 may be manufactured as a film capacitor or a ceramic capacitor, and the first inductor 223 formed between the electrolytic capacitor 221 and the right non-electrolytic capacitor 222 may have a coupling structure.

The right first inductor 223 has the coupling structure to improve an EMC problem.

For example, when the one first inductor 223 is formed between the right non-electrolytic capacitor 222 and the electrolytic capacitor 221, a phase difference due to noise may occur between high voltages generated from the input end 210, and high-voltage common-mode noise due to the phase difference may be left at the output end 220, causing a serious EMC problem.

Therefore, the coupled first inductor 223 is formed between the right non-electrolytic capacitor 222 and the electrolytic capacitor 221 to prevent the above-described EMC problem.

As is understood from the above description, the coupled first inductors 223 and 223 are applied to the both ends of the electrolytic capacitor 221, thereby balancing an inductance between (+)/(−) of a high-voltage link generated from the input end 210 to reduce high-voltage common-mode noise. In this way, it is possible to improve EMC performance in the power factor improving circuit 100.

In an illustrative example, the DC-DC converter 230 is connected to the output end 220 to invert a first DC voltage including a sinusoidal wave output from the power factor improving circuit into an AC voltage, and to convert the inverted AC voltage into a second DC voltage.

The DC-DC converter 230 preferably corresponds to a boost converter.

For example, the boost converter may include four IGFET circuits 231 connected in parallel to the output end 220, a pair of inductors 232 connected in parallel between upper and lower IGFET circuits of the IGFET circuits 231, four diodes 233 connected in parallel to the inductors 232, an inductor 236 connected to output ends of the four diodes 233, and two electrolytic capacitors 235, each of which has one end connected to input ends of the four diodes 233 and the other end connected to the inductor 236.

However, the invention is not restricted to the above-described circuit configuration of the boost converter. Further, when a converter not corresponding to the boost converter is used to improve a power factor and increase a voltage, the converter may be contained in a DC-DC converter category in the present embodiment.

<Comparative Example>

Figure 3:
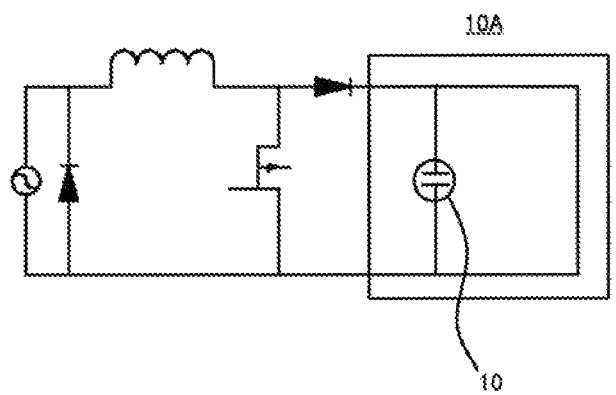
FIG. 3 is a circuit diagram illustrating a conventional power factor improving circuit compared with the power factor improving circuit of FIGS. 1 and 2.
Figure 4:
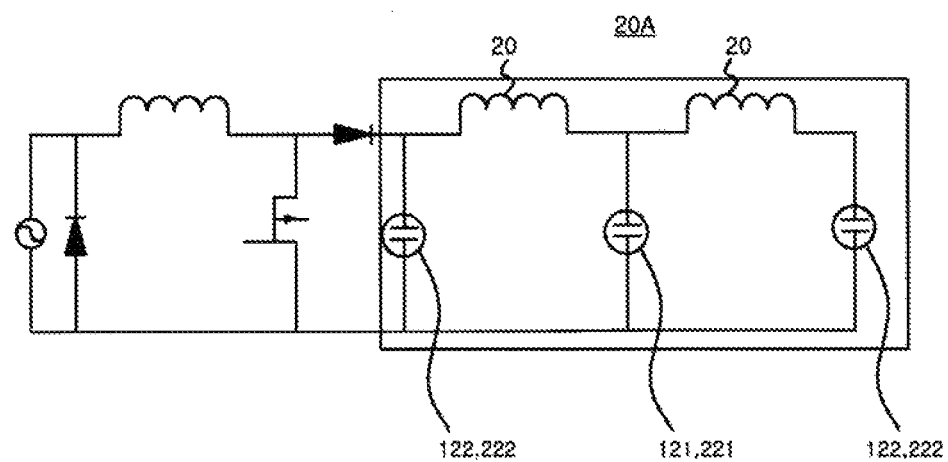
FIG. 4 is a circuit diagram illustrating a power factor improving circuit compared with the power factor improving circuit of FIGS. 1 and 2.

FIG. 3 is a circuit diagram illustrating a conventional power factor improving circuit compared with the power factor improving circuit of FIGS. 1 and 2, and FIG. 4 is a circuit diagram illustrating a power factor improving circuit compared with the power factor improving circuit of FIGS. 1 and 2.

Referring to FIG. 3, the conventional power factor improving circuit includes an input end having the same circuit configuration as that of each of the input ends 110 and 210 described with reference to FIGS. 1 and 2. However, the conventional power factor improving circuit includes only one electrolytic capacitor 10 at an output end 10A unlike the output ends 120 and 220 of FIGS. 1 and 2.

When only one electrolytic capacitor 10 is included in the output end 10A, a probability of reliability degradation of a charger and occurrence of an EMC problem may significantly increase due to insufficient countermeasures for improvement of EMC and decrease in current stress of an FPC output electrolytic capacitor.

Meanwhile, an output end 20A of the power factor improving circuit illustrated in FIG. 4 includes an electrolytic capacitor 121 for output and non-electrolytic capacitors 122 and 122 connected to both sides of the electrolytic capacitor 121 as described with reference to FIGS. 1 and 2. Unlike the coupled first inductors 123 and 223 of FIGS. 1 and 2, one inductor 20 may be configured between the electrolytic capacitor 121 and each of the non-electrolytic capacitors.

In this case, it was found that a phase difference of noise was generated between (+)/(−) of a high-voltage link due to the one inductor 20, and common-mode noise due to the phase difference was generated, causing a serious EMC problem.

In this regard, the power factor improving circuit implemented in FIGS. 1 and 2 could reduce a ripple current (current stress) and solve the EMC problem when compared to FIGS. 3 and 4 described above.

As described in the foregoing, the present embodiments may obtain advantageous effects as below when compared to the related art.

First, the present embodiments reduce a ripple current (current stress) at a PFC output end through a CL circuit formed at a left side with respect to an electrolytic capacitor, and reduce an input ripple current (input current stress) of a DC-DC converter through an LC circuit formed at a right side.

Second, forms of the present disclosure reduce high-voltage common-mode noise, improving EMC performance since an inductance at a high-voltage DC link may be balanced through coupled inductors.

Third, forms of the present disclosure may optimize a size of a charger and reduce a weight of the charger (improvement of mass) since an electrostatic capacity of a PFC output capacitor is optimized.

Fourth, forms of the present disclosure may optimize a size of a charger and reduce a weight of the charger (improvement of mass) since an input/output EMC filter is reduced in size.

Fifth, forms of the present disclosure may reduce manufacturing costs since a high-priced electrolytic capacitor for output and an input/output EMC filter of a charger are reduced in size and applied due to a low-priced filter configuration.

Forms of the present disclosure have been described with reference to appended drawings. However, those skilled in the art will appreciate that the present invention may be carried out in other specific ways than those set forth herein without departing from the spirit and essential characteristics of the present invention. The above embodiments are therefore to be construed in all aspects as illustrative and not restrictive.

The present disclosure is applicable to an electric vehicle (EV), a hybrid electric vehicle (HEV), a plug-in hybrid electric vehicle (PHEV), a fuel cell electric vehicle (FCEV), and a battery electric vehicle (BEV).

What is claimed is:

1. A power factor improving circuit comprising:
an input end; and
an output end connected to a direct current (DC)-DC converter and configured to improve a power factor through the input end, wherein between the input end and the DC-DC converter connected to the output end comprises:
a CL filter including:
a first non-electrolytic capacitor connected in parallel to the input end; and
a first coupled inductor connected in parallel to the first non-electrolytic capacitor;
an electrolytic capacitor connected in parallel to the first coupled inductor; and
an LC filter including:
a second coupled inductor connected in parallel to the electrolytic capacitor; and
a second non-electrolytic capacitor connected in parallel to the second coupled inductor;
wherein the electrolytic capacitor is directly coupled to each of the CL and LC filters.

2. The power factor improving circuit according to claim 1, wherein the input end includes an input power supply, an inductor, a diode, and an insulated gate field-effect transistor (IGFET) circuit connected to one another in series and in parallel.

3. The power factor improving circuit according to claim 1, wherein each of the first non-electrolytic capacitor and the second non-electrolytic capacitor corresponds to a film capacitor or a ceramic capacitor.

4. The power factor improving circuit according to claim 1, wherein the first coupled inductor and the second coupled inductor are coupled at the both sides of the electrolytic capacitor.

5. A charger for vehicles for charging a high-voltage battery, the charger for vehicles comprising:
a power factor improving circuit including an input end and an output end, wherein the output end is configured to improve a power factor through the input end; and
a direct current (DC)-DC converter connected to the output end, wherein the DC-DC converter is configured to:
invert a first DC voltage including a sinusoidal wave output from the power factor improving circuit into an alternating current (AC) voltage; and
convert the inverted AC voltage into a second DC voltage;
wherein between the input end and DC-DC converter connected to the output end comprises:
a CL filter including:

a first non-electrolytic capacitor connected in parallel to the input end; and a first coupled inductor connected in parallel to the first non-electrolytic capacitor;

an electrolytic capacitor connected in parallel to the first coupled inductor; and an LC filter including:

a second coupled inductor connected in parallel to the electrolytic capacitor; and a second non-electrolytic capacitor connected in parallel to the second coupled inductor;

wherein the electrolytic capacitor is directly coupled to each of the CL and LC filters.

6. The charger for vehicles according to claim 5, wherein the input end includes an input power supply, an inductor, a diode, and an IGFET circuit connected to one another in series and in parallel.

7. The charger for vehicles according to claim 5, wherein each of the first non-electrolytic capacitor and the second non-electrolytic capacitor corresponds to a film capacitor or a ceramic capacitor.

8. The charger for vehicles according to claim 5, wherein the first coupled inductor and the second coupled inductor are coupled at the both sides of the electrolytic capacitor.

9. The charger for vehicles according to claim 5, wherein the DC-DC converter corresponds to a boost converter.

* * * * *